United States Patent
Otsubo et al.

(10) Patent No.: US 7,895,830 B2
(45) Date of Patent: Mar. 1, 2011

(54) EXHAUST GAS PURIFICATION SYSTEM FOR INTERNAL COMBUSTION ENGINE AND EXHAUST GAS PURIFICATION METHOD THEREFOR

(75) Inventors: Yasuhiko Otsubo, Toyota (JP); Tatsuhisa Yokoi, Toyota (JP); Shigehiro Matsuno, Toyota (JP); Ikuo Hoda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 587 days.

(21) Appl. No.: 11/819,894

(22) Filed: Jun. 29, 2007

(65) Prior Publication Data
US 2008/0034737 A1 Feb. 14, 2008

(30) Foreign Application Priority Data
Jul. 3, 2006 (JP) .............................. 2006-182988

(51) Int. Cl.
*F01N 3/00* (2006.01)
(52) U.S. Cl. .............................. 60/292; 60/276; 60/277; 60/311; 60/324
(58) Field of Classification Search .................. 60/276, 60/277, 292, 295, 297, 324, 311
See application file for complete search history.

(56) References Cited
U.S. PATENT DOCUMENTS

| | | | |
|---|---|---|---|
| 6,381,952 B1 * | 5/2002 | Asanuma et al. .............. | 60/284 |
| 6,711,892 B2 * | 3/2004 | Tamura et al. ................ | 60/277 |
| 6,968,677 B2 * | 11/2005 | Tamura ........................ | 60/277 |
| 6,988,361 B2 * | 1/2006 | van Nieuwstadt et al. ..... | 60/295 |
| 7,051,689 B2 | 5/2006 | Tamura et al. | |
| 7,146,803 B2 * | 12/2006 | Streib .......................... | 60/289 |
| 7,178,330 B2 * | 2/2007 | Kouzu et al. ................... | 60/289 |
| 7,721,534 B2 * | 5/2010 | Sato et al. ..................... | 60/295 |

FOREIGN PATENT DOCUMENTS

| | | |
|---|---|---|
| JP | 4-81513 | 3/1992 |
| JP | 8-291707 | 11/1996 |
| JP | 2003-074328 | 3/2003 |
| JP | 2003-269147 A | 9/2003 |
| JP | 2005-76604 | 3/2005 |

OTHER PUBLICATIONS

Japanese Office Action dated May 30, 2008.

* cited by examiner

*Primary Examiner*—Tu M Nguyen
(74) *Attorney, Agent, or Firm*—Finnegan, Henderson, Farabow, Garrett & Dunner, LLP

(57) ABSTRACT

If an exhaust throttle valve changes to ON state from OFF state under a filter regeneration control condition for regenerating a PM filter, a differential pressure sensor detects a change of a differential pressure following an operation of the exhaust throttle valve. An increase in an exhaust backpressure is calculated based upon the change in the differential pressure. If the increase in the exhaust backpressure is lower than a predetermined value, the operation of the exhaust throttle valve is determined to be malfunctioning.

9 Claims, 4 Drawing Sheets

FIG.2
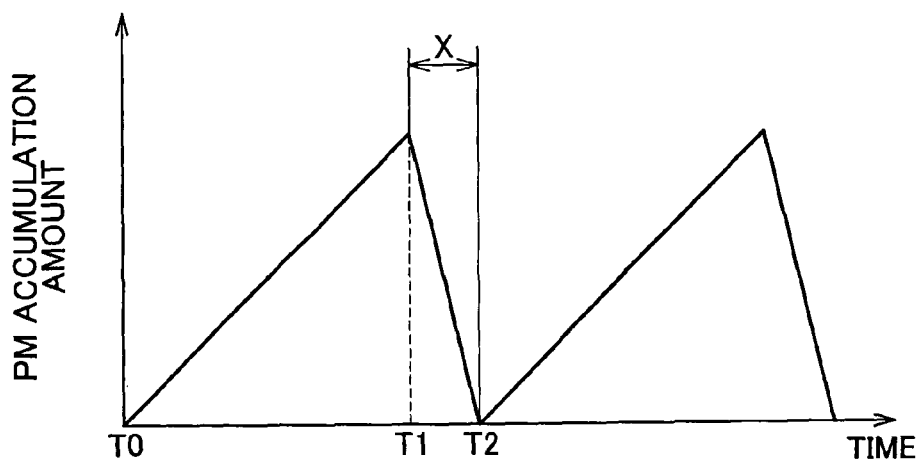
FIG.3A
VEHICLE SPEED
FIG.3B
EXHAUST THROTTLE VALVE
FIG.3C
DIFFERENTIAL PRESSURE
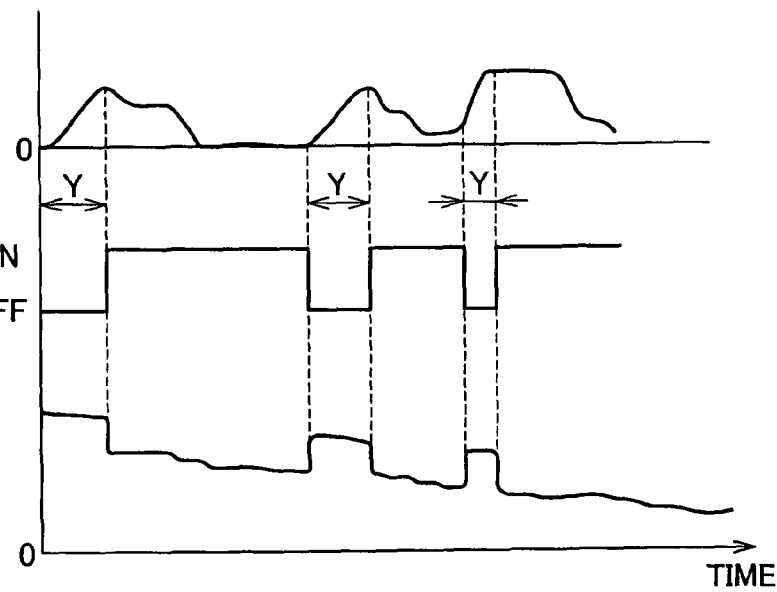

EXHAUST GAS PURIFICATION SYSTEM FOR INTERNAL COMBUSTION ENGINE AND EXHAUST GAS PURIFICATION METHOD THEREFOR

INCORPORATION BY REFERENCE

The disclosure of Japanese Patent Application No. 2006-182988 filed on Jul. 3, 2006, including the specification, drawings and abstract is incorporated herein by reference in its entirety.

BACKGROUND OF THE INVENTION

1. Field of the Invention

The invention relates to an exhaust gas purification system for an internal combustion engine that has a filter disposed in an exhaust passage for trapping particulate matter discharged from the engine and also relates to an exhaust gas purification method for such an internal combustion engine.

2. Description of the Related Art

Conventionally, as an exhaust gas purification system applied to an internal combustion engine, such as a diesel engine for a vehicle, a system is known which includes a filter disposed in the exhaust passage for trapping particulate matter (PM) discharged from the engine. In such an exhaust gas purification system, the exhaust backpressure increases as the amount of accumulated PM trapped by the filter increases and invites problems such as deterioration of fuel economy. Thus, the pressure differential between upstream and downstream portions of the exhaust passage relative to the filter is detected to estimate the amount of accumulated PM. If the amount of accumulated PM is excessive, the PM is removed, e.g., burned, to regenerate the filter. One method for regenerating the filter that is widely used uses an oxidation catalyst to lower the oxidation temperature of the PM and to oxidize the PM using the exhaust heat from the engine. The use of the oxidation catalyst provides an advantage such that the filter is continuously regenerated without receiving any energy from the outside.

However, if the engine is operating under conditions where the exhaust temperature is low, such as when the engine is idling and/or under a low load, for an extended period, the PM is not oxidized even though the PM continues to accumulate. This situation can invite deterioration of fuel economy resulting from the increase of the exhaust backpressure and/or abnormal burning resulting from the trapping of excessive PM. An exhaust gas purification system thus is proposed in which an exhaust throttle valve is disposed downstream of the filter and an opening amount of the exhaust throttle valve is controlled to maintain the exhaust temperature in a predetermined regeneration temperature range when the filter is regenerated (for example, see JP-A-4-81513). Another exhaust gas purification system is also proposed in which fuel injection times are controlled, in addition to the control of the exhaust throttle valve, to maintain the exhaust temperature in the predetermined regeneration temperature range when the filter is regenerated (for example, see JP-A-2005-76604). Maintaining the filter in the regeneration temperature range as discussed above expedites the oxidization of the PM and accelerates the regeneration speed of the filter.

Meanwhile, the exhaust gas purification systems described above have the following drawbacks when the exhaust throttle valve malfunctions, because the systems control the exhaust temperature by controlling the opening amount of the exhaust throttle valve. That is, if the opening amount of the exhaust throttle valve is not reduced to a desired opening amount under the filter regeneration condition, the exhaust temperature does not increase sufficiently and the oxidization of the PM trapped by the filter does not proceed adequately. In this connection, the regeneration speed of the filter is estimated erroneously, and the filter regeneration may be stopped prematurely. Thus, a significant portion of the accumulated PM remains trapped in the filter. If the PM remains, the exhaust backpressure may increase and adversely affect fuel economy. Also, if an excessive amount of PM is trapped, the filter may melt as a result of abnormal burning of the PM.

SUMMARY OF THE INVENTION

It is an object of the invention to provide an exhaust gas purification system for an internal combustion engine and an exhaust gas purification method therefor that properly detects the operational condition of an exhaust throttle valve provided for regenerating a filter which traps PM.

A first aspect of the invention relates to an exhaust gas purification system for an internal combustion engine that has a filter disposed in an exhaust passage that traps PM discharged from the engine; an exhaust throttle valve disposed downstream of the filter in the exhaust passage that adjusts the cross sectional area of the exhaust passage; and a differential pressure sensor that detects the differential pressure between a portion of the exhaust passage upstream of the filter (hereinafter "upstream portion of the exhaust passage") and a portion of the exhaust passage downstream of the filter (hereinafter "downstream portion of the exhaust passage"). The exhaust throttle valve is operated based upon the differential pressure to aid the burning of the PM trapped by the filter so as to regenerate the filter. The exhaust gas purification system includes a determining section that determines whether there is a malfunction of the exhaust throttle valve based upon changes in the differential pressure that occur when the exhaust throttle valve is operated.

According to the aspect, the malfunction of the exhaust throttle valve is detected based upon the change in the differential pressure that occurs when the exhaust throttle valve is operated and is detected by the differential pressure sensor, which detects the differential pressure between the upstream and downstream portions of the exhaust passage when the exhaust throttle valve is operated. When the exhaust throttle valve is operated, the change in the differential pressure detected by the differential pressure sensor differs in accordance with opening amounts of the exhaust throttle valve. For example, if an open exhaust throttle valve is closed, exhaust gas discharged through the exhaust passage decreases because the cross sectional area of the exhaust passage is reduced. Thus, the pressure in both the upstream and downstream portions of the exhaust passage increases. Accordingly, the differential pressure between the upstream and downstream portions of the exhaust passage decreases because the flow of the exhaust gas passing through the filter is repressed. On the other hand, if the opening amount of the exhaust throttle valve is reduced, more exhaust gas is discharged through the exhaust passage than when the exhaust throttle valve is closed. Therefore, the pressure in the upstream and downstream portions of the filter are slightly varied as compared to when the exhaust throttle valve is closed, and a decrease in the differential pressure between the upstream and downstream portions of the filter is reduced.

As thus described, the operational conditions of the exhaust throttle valve may be detected through the change in the differential pressure when the exhaust throttle valve is operated. If, therefore, the open exhaust throttle valve is closed, but the exhaust throttle valve is prevented from closing, this malfunction of the exhaust throttle valve can be detected and determined. Accordingly, such a situation can be favorably avoided that the filter regeneration does not sufficiently proceed due to the malfunction of the exhaust throttle valve and the deterioration of the fuel economy and the melting loss of the filter are invited.

In this aspect, preferably, the determining means calculate an increase in an exhaust backpressure in a portion of the exhaust passage upstream of the exhaust throttle valve based upon the change in the differential pressure and determine whether there is a malfunction with the exhaust throttle valve based upon the increase in the exhaust backpressure.

According to the above construction, the increase in the exhaust backpressure in the portion of the exhaust passage upstream of the exhaust throttle valve is calculated based upon the change in the differential pressure and a malfunction of the exhaust throttle valve is determined based upon the increase in the exhaust backpressure. When the exhaust throttle valve is operated, the differential pressure between the upstream and downstream portions of the exhaust passage relative to the filter is detected by the differential pressure sensor changes. The differential pressure and changes in the differential pressure both vary in accordance with the amount of accumulated PM trapped by the filter. For example, if the amount of accumulated PM is large, the differential pressure is greater because of the pressure loss caused by the PM, and the decrease in the differential pressure resulting from the operation of the exhaust throttle valve is larger. On the other hand, if the amount of accumulated PM is small, the differential pressure is smaller, and the decrease in the differential pressure resulting from the operation of the exhaust throttle valve is smaller.

Therefore, using the condition that a value obtained through the division of the differential pressure by the volume of the exhaust gas decreases in accordance with the exhaust backpressure, the increase in the exhaust backpressure in the portion of the exhaust passage upstream of the exhaust throttle valve is calculated based upon values such as a change amount of the differential pressure, the volume of the exhaust gas and a temperature of the exhaust gas. Whether the exhaust throttle valve is malfunctioning is determined based upon the increase in the exhaust backpressure. That is, if the increase in the exhaust backpressure is less than an assumed increase when the exhaust throttle valve is operated, it is determined that the opening amount of the exhaust throttle valve has not been reduced to the desired opening amount. Thus, it is determined that the exhaust throttle valve is malfunctioning. Thereby, the temperature and the regeneration speed of the filter can increase sooner to their proper levels. The PM thus can be almost completely burned. Meanwhile, if the increase in the exhaust backpressure reaches the assumed increase when the exhaust throttle valve is operated, it is determined that the exhaust throttle valve is normal. The filter thus can be properly regenerated. As thus discussed, the increase in the exhaust backpressure can provide the accurate malfunction determination of the exhaust throttle valve even though the differential pressure and the change amount of the differential pressure vary due to the amount of accumulated PM.

In the aspect, preferably, the exhaust throttle valve is opened and closed, and the determining section determines that the exhaust throttle valve is malfunctioning if the increase in the exhaust backpressure is less than a predetermined value when the open exhaust throttle valve is closed.

According to the above construction, the increase in the exhaust backpressure in the upstream portion of the exhaust throttle valve is calculated based upon the change in the differential pressure detected by the differential pressure sensor when the open exhaust throttle valve is closed. If the increase in the exhaust backpressure is less than the predetermined value, it is determined that there is a malfunction with the exhaust throttle valve. If the exhaust throttle valve is opened and closed, conditions controlled when the exhaust throttle valve is operated are fixed. Thus, the malfunction of the exhaust throttle valve may be easily determined through a comparison of the increase in the exhaust backpressure with the predetermined value, which is the threshold.

In the aspect, preferably, estimating means may be added for estimating a regeneration degree of the filter based upon the differential pressure unless the determining means determines that the exhaust throttle valve is malfunctioning.

According to the above construction, the regeneration degree of the filter is estimated based upon the differential pressure detected by the differential pressure sensor unless it is determined that the exhaust throttle valve is malfunctioning. If the amount of accumulated PM trapped by the filter is large, the differential pressure is greater because of the pressure loss caused by the PM, and the decrease in the differential pressure resulting from the operation of the exhaust throttle valve is greater. On the other hand, if the amount of accumulated PM is small, the differential pressure is smaller, and the decrease in the differential pressure resulting from the operation of the exhaust throttle valve is smaller. Therefore, the amount of accumulated PM trapped by the filter and the regeneration degree of the filter may be estimated based upon the differential pressure and the change in the differential pressure. Accordingly, the termination time of the regeneration of the filter may be properly determined, and the unnecessary or insufficient regeneration of the filter may be prevented. As thus described, a malfunction of the exhaust throttle valve is determined based upon the change in the differential pressure. Whenever the exhaust throttle valve operates normally, the regeneration degree of the filter can be estimated based upon the differential pressure.

In the aspect, the estimating means may calculate an increase in an exhaust backpressure in a portion of the exhaust passage upstream of the exhaust throttle valve based upon the change in the differential pressure and calculate a regeneration speed of the filter corresponding to the increase in the exhaust backpressure to estimate the regeneration degree.

According to the above construction, the increase in the exhaust backpressure in the portion of the exhaust passage upstream of the exhaust throttle valve is calculated based upon the change in the differential pressure detected by the differential pressure sensor, and the regeneration speed of the filter corresponding to the increase in the exhaust backpressure is calculated to estimate the regeneration degree. When the exhaust backpressure increases, the amount of oxygen reacting with the PM increases because of increase of the volume of the exhaust gas. The burning speed of the PM thus increases in proportion to the exhaust backpressure. Therefore, using the calculated increase in the exhaust backpressure, the regeneration speed of the filter may be accurately calculated. The regeneration degree of the filter is properly estimated, accordingly.

A second aspect of the invention relates to an exhaust gas purification system for an internal combustion engine which has a filter, disposed in an exhaust passage, that traps PM discharged from the engine; a cross sectional area varying mechanism disposed downstream of the filter in the exhaust passage that adjusts the cross sectional area of the exhaust passage; a differential pressure sensor that detects the differential pressure between a portion of the exhaust passage upstream of the filter and a portion of the exhaust passage downstream of the filter, the passage cross sectional area is varied to aid the burning of the PM trapped by the filter so as to regenerate the filter. The exhaust gas purification system includes determining means for determining whether there is a malfunction with the cross sectional area varying mechanism based upon the change in the differential pressure that follows the variation of the cross sectional area.

A third aspect of the invention relates to an exhaust gas purification method for an internal combustion engine. In this exhaust gas purification method, a differential pressure between a portion of the exhaust passage upstream of a filter and a portion of the exhaust passage downstream of the filter is detected. The filter is disposed in the exhaust passage to trap PM discharged from the engine. The cross sectional area of the exhaust passage is varied based upon the differential pressure to aid the burning of the PM trapped by the filter. Malfunction of the exhaust throttle valve is determined based upon a change in the differential pressure when the cross sectional area of the exhaust passage is varied.

In the aspect, an increase in an exhaust backpressure in a portion of the exhaust passage upstream of the exhaust throttle valve may be calculated based upon the change in the differential pressure and a malfunction of the exhaust throttle valve is determined based upon the increase in the exhaust backpressure.

In the aspect, a malfunction of the exhaust throttle valve may be determined if the increase in the exhaust backpressure is below a predetermined value when the exhaust passage cross sectional area varies after the operation of the exhaust throttle valve.

In the aspect, the regeneration degree of the filter may be estimated based upon the differential pressure unless it is determined that the exhaust throttle valve is malfunctioning.

In the aspect, the increase in an exhaust backpressure in a portion of the exhaust passage upstream of the exhaust throttle valve may be calculated based upon the change in the differential pressure and a regeneration speed of the filter corresponding to the increase in the exhaust backpressure may be calculated to estimate the regeneration degree.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a time chart showing the amount of accumulated PM against the operation time of the engine.

FIG. 3A is a time chart showing vehicle speed when a filter regeneration control is executed, FIG. 3B is a time chart showing conditions of an exhaust throttle valve in the same time period, and FIG. 3C is a time chart showing changes of a differential pressure in the same time period.

DETAILED DESCRIPTION OF THE PREFERRED EMBODIMENTS

With reference to FIGS. 1 through 6, an embodiment of the present invention will be described below.

Figure 1:
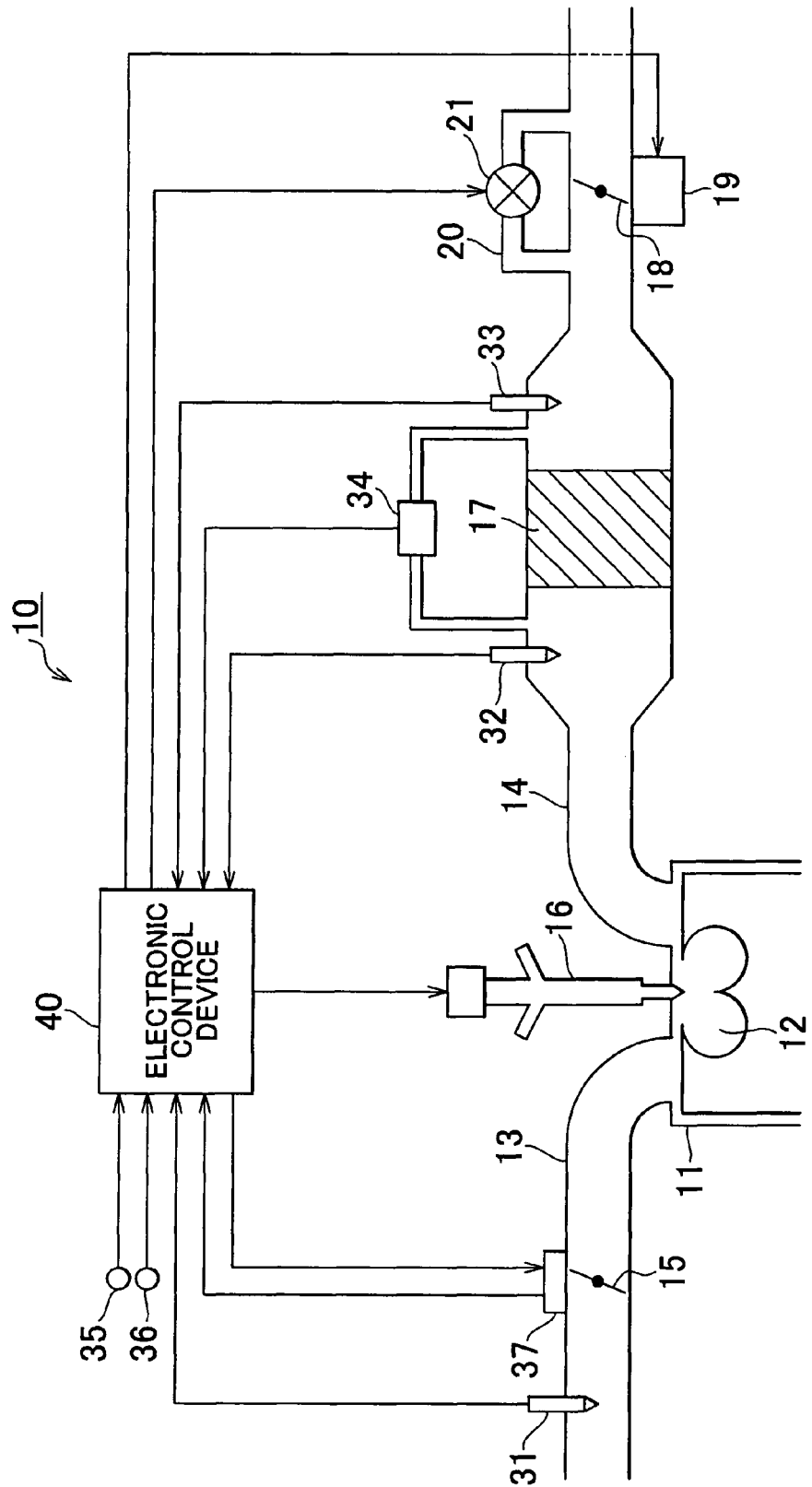
FIG. 1 is a block diagram of an internal combustion engine for an automobile, the engine having an exhaust gas purification system according to the invention.

FIG. 1 is a block diagram of an internal combustion engine for an automobile, the engine having an exhaust gas purification system according to the invention. An engine 10 has a combustion chamber 12 defined in every cylinder 11, an intake passage 13 for delivering intake air to each combustion chamber 12, and an exhaust passage 14 through which exhaust gas formed by combustion in each combustion chamber 12 is discharged.

The intake passage 13 has an intake throttle valve 15 that can adjust the cross sectional area of the intake passage 13. The opening amount of the intake throttle valve 15 is adjusted to control an amount of air introduced into the combustion chamber 12. The air introduced in the combustion chamber 12 is mixed with fuel injected by a fuel injector 16 and directed toward the combustion chamber 12 to be a mixture. The mixture is burned in the combustion chamber 12. The intake passage 13 has an airflow meter 31 that detects the amount of air introduced into the combustion chamber 12.

The exhaust passage 14 includes a PM filter 17 that traps PM. The exhaust gas from the combustion chamber 12 is delivered to the PM filter 17. The PM filter 17 is made of a porous material to trap the PM in the exhaust gas. The PM filter 17 contains an oxidation catalyst that oxidizes hydrocarbon (HC) and carbon monoxide (CO) in the exhaust gas. A reaction catalyzed by the oxidation catalyst burns (oxidizes) the PM trapped by the PM filter 17, thereby removing the PM.

A first temperature sensor 32 is disposed upstream of the PM filter 17 in the exhaust passage 14 to detect the temperature of the exhaust gas entering the PM filter 17. A second temperature sensor 33 is disposed downstream of the PM filter 17 in the exhaust passage 14 to detect the temperature of the exhaust gas that has passed through the PM filter 17. The exhaust passage 14 also has a differential pressure sensor 34 that detects the differential pressure between upstream and downstream portions of the exhaust passage 14 relative to the PM filter 17.

An exhaust throttle valve 18 is disposed downstream of the PM filter 17 in the exhaust passage 14. The exhaust throttle valve 18 opens or closes the exhaust passage 14. An actuator 19 drives the exhaust throttle valve 18 in an ON/OFF binary mode. The exhaust throttle valve 18 is open (OFF state) or closed (ON state) in response to conditions of the actuator 19. That is, when the actuator 19 takes OFF condition, the exhaust throttle valve 18 is open (OFF state) so that the exhaust passage 14 is fully open. Meanwhile, when the actuator 19 takes ON condition, the exhaust throttle valve 18 is closed (ON state) so that the exhaust passage 14 is fully closed.

The exhaust passage 14 has a waste gate 20 connecting the upstream portion and the downstream portion of the exhaust passage 14 relative to the exhaust throttle valve 18. The waste gate 20 has a waste gate valve 21. An opening amount of the waste gate valve 21 is adjusted to control the pressure in the upstream portion relative to the exhaust throttle valve 18 when the exhaust throttle valve 18 is closed.

An electronic control device 40 executes various controls of the engine 10. The electronic control device 40 includes a CPU, ROM, RAM, input and output ports and so forth. The CPU executes various calculation processes for controlling the engine 10. The ROM stores programs and data necessary for the controls. The RAM temporarily stores calculations of the CPU, or the like. The input and output ports are used for inputting and outputting signals from and to external equipment, respectively.

The input ports of the electronic control device 40 are connected to, in addition to the respective sensors described above, an engine speed sensor 35 that detects the engine speed; an accelerator position sensor 36 that detects the operational amount of an accelerator; an intake throttle valve position sensor 37 that detects the opening amount of the intake throttle valve 15, and so forth. The output ports of the electronic control device 40 are connected to drive circuits for the intake throttle valve 15, the fuel injectors 16, the exhaust throttle valve 18, the waste gate valve 21 and so forth.

The electronic control device 40 outputs command signals to the drive circuits of the respective devices connected to the output ports in response to engine operational conditions indicated by detection signals received from the respective sensors. In such ways, the electronic control device 40 executes the various controls such as an opening control of the intake throttle valve 15, fuel injection controls of the fuel injectors 16, an opening control of the exhaust throttle valve 18 and an opening control of the waste gate valve 21.

The exhaust gas purification system for the engine 10 as thus constructed executes a filter regeneration control under which the PM accumulated in the PM filter 17, i.e., the PM trapped by the PM filter 17 during operations of the engine 10, are removed by burning. The filter regeneration control is executed as follows. That is, the exhaust throttle valve 18 is operated to increase the exhaust temperature and the exhaust backpressure, and unburned fuel components are supplied to the oxidation catalyst held by the PM filter 17. Heat, therefore, is generated following the oxidization of the unburned fuel components in the exhaust gas and on the catalyst. The heat activates the catalyst and burns the PM around the catalyst. The unburned fuel components are supplied to the catalyst for the filter regeneration control by, for example, post injections which are fuel injections made in the exhaust strokes after the fuel injections made through the fuel injectors 16 for contributing to the operation of the engine 10. The filter regeneration control executed by the electronic control device 40 will be described in detail below.

FIG. 2 shows the amount of accumulated PM against the operation time of the engine 10. When the engine 10 starts to operate at a time T0, the amount of accumulated PM trapped by the PM filter increases over time. The electronic control device 40 determines that the amount of accumulated PM is excessive when the mileage of the vehicle reaches a predetermined mileage, or when a differential pressure between the upstream and downstream portions relative to the PM filter 17 detected by the differential pressure sensor 34 exceeds a predetermined amount. The electronic control device 40 then starts the filter regeneration control. When the filter regeneration control is started at a time T1, the amount of accumulated PM begins to decrease and reaches "0" at a time T2. The electronic control device 40 repeats the control to reduce the amount of the PM discharged outside.

A control manner for the filter regeneration control executed during a time period X will be described below. FIG. 3 shows vehicle speeds, conditions of the exhaust throttle valve 18 and changes in the differential pressure detected by the differential pressure sensor 34. If the vehicle speeds change as shown in FIG. 3A, the electronic control device 40 drives the exhaust throttle valve 18 as shown in FIG. 3B. That is, if the vehicle is accelerating (time period Y), the electronic control device 40 controls the exhaust throttle valve 18 in the OFF state in which the exhaust passage 14 is fully opened. If the vehicle is running at a constant speed, decelerating, or idling other than accelerating, the electronic control device 40 controls the exhaust throttle valve 18 in the ON state in which the exhaust passage 14 is fully closed. When the vehicle is accelerating, the amount of the air introduced into the combustion chambers 12 increases. The acceleration of the vehicle thus is not deteriorated even though the exhaust throttle valve 18 is closed (ON state).

When the exhaust throttle valve 18 is closed so that the exhaust passage 14 is fully closed, the exhaust temperature and the exhaust backpressure in the upstream portion relative to the exhaust throttle valve 18 both increase. The increase of the exhaust temperature activates the oxidation catalyst held by the PM filter 17 to expedite the burning of the accumulating PM. Meanwhile, the increase in the exhaust backpressure increases the volume of the air. The amount of oxygen used for the burning of the PM is also increased. Therefore, the PM is oxidized rapidly and the burning of the PM is further expedited. Because the burning of the PM is expedited, the time period X during which the filter regeneration control is executed is shortened. The less unburned fuel components are supplied from the fuel injectors. Accordingly, fuel economy is not deteriorated.

The differential pressure $\Delta P$ detected by the differential pressure sensor 34 changes as shown in FIG. 3C during the time period X in which the filter regeneration control is executed. That is, the differential pressure $\Delta P$ decreases together with closing the open exhaust throttle valve 18, while the differential pressure $\Delta P$ increases together with closing the open exhaust throttle valve 18. Following the reduction in the amount of accumulated PM, the differential pressure $\Delta P$ in the closed state and the differential pressure $\Delta P$ in the open state both gradually decrease.

The principle of decrease of the differential pressure $\Delta P$ caused by closing the open exhaust throttle valve 18 will be described below. It is assumed that the exhaust gas existing in the upstream portion of the exhaust passage 14 relative to the exhaust throttle valve 18 and in the combustion chamber 12 make an adiabatic change when the exhaust throttle valve 18 is operated. If the atmospheric pressure is P0 and the exhaust backpressure after the operation of the exhaust throttle valve 18 is P1, the volume of the exhaust gas per fixed mass decreases following the increase in the exhaust backpressure from P0 to P1 in view of the iso-entropy change equation ($PV^K$=constant). Therefore, the flow speed of the exhaust gas in the exhaust passage 14 decreases to be $(P0/P1)^K$ times of the flow speed given before closing the open exhaust throttle valve 18. Assuming that the flow of the exhaust gas passing through the PM filter 17 is laminar, the pressure loss caused by the PM filter 17 is proportional to the flow speed. Also, assuming that the exhaust gas is an ideal gas, the viscosity coefficient of the ideal gases does not depend on pressure. Using those facts, the differential pressure $\Delta P$ is also to be $(P0/P1)^K$ times of the flow speed given before the operation of the exhaust throttle valve 18. In such a way, closing the open exhaust throttle valve 18 decreases the differential pressure $\Delta P$.

Next, the malfunction determination of the exhaust throttle valve 18 executed by the electronic control device 40 will be described below. The electronic control device 40 determines whether there is a malfunction with the exhaust throttle valve 18 based upon a change in the differential pressure $\Delta P$ that occurs through the operation of the exhaust throttle valve 18 during the execution of the filter regeneration control. If the exhaust throttle valve 18 is malfunctioning, e.g., if the exhaust passage 14 is not fully closed when the exhaust throttle valve 18 has become fully closed, the exhaust temperature and the exhaust backpressure do not increase even though the exhaust throttle valve 18 is operated. The burning of the PM thus is not expedited. Therefore, the electronic control device 40 executes the following control to detect the any malfunction of the exhaust throttle valve 18.

Figure 4:
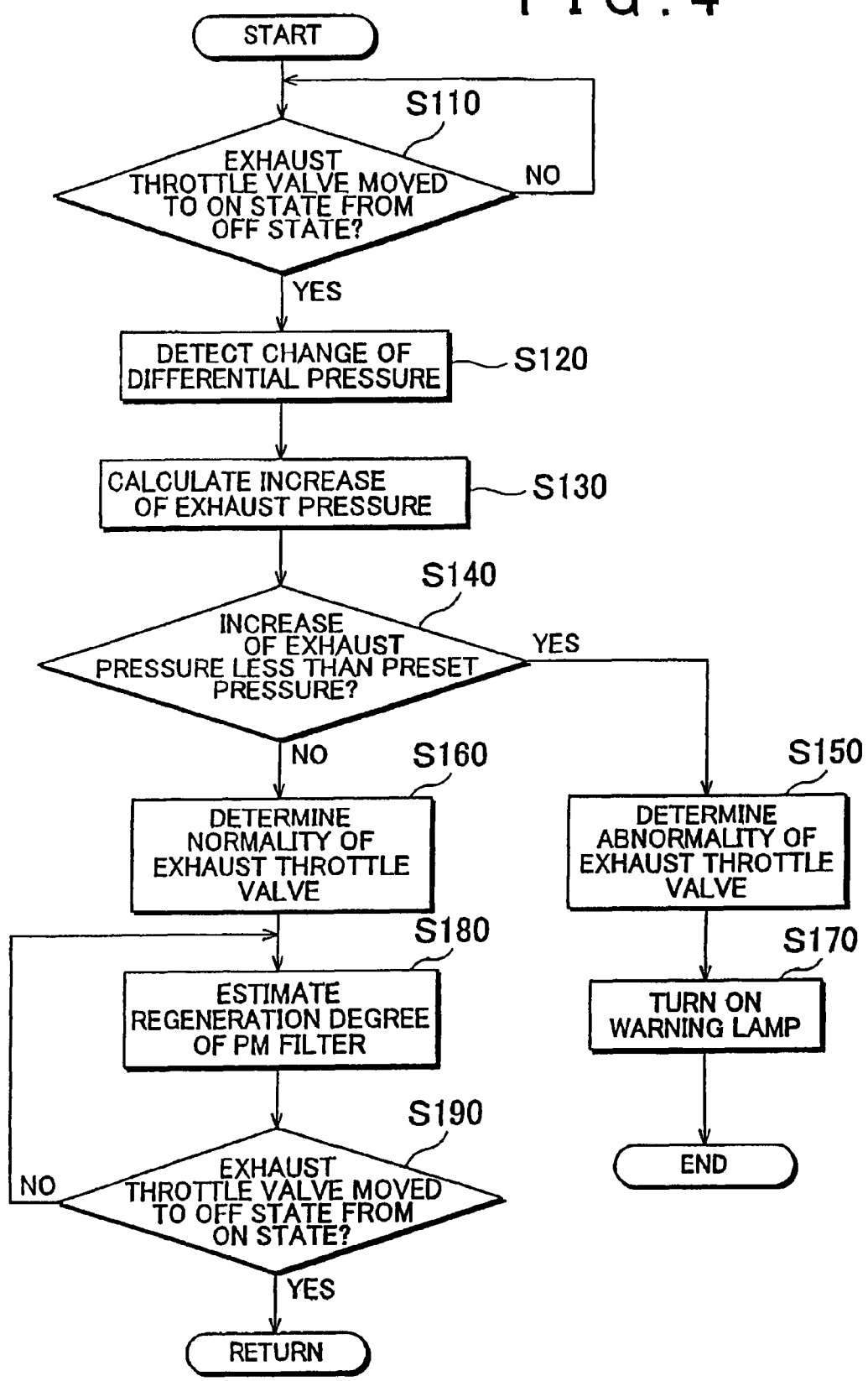
FIG. 4 is a flowchart for an exhaust throttle valve malfunction determining routine.

FIG. 4 shows a flowchart for an exhaust throttle valve malfunction determining routine executed by the electronic control device 40. The exhaust throttle valve malfunction determining routine is executed when the filter regeneration control is executed. At the start of the exhaust throttle valve malfunction determining routine, the electronic control device 40 determines whether the exhaust throttle valve 18 has become fully closed (step S110). That is, the electronic control device 40 determines whether the vehicle is no longer accelerating. Unless the exhaust throttle valve 18 has become fully closed, the electronic control device 40 repeats this step.

If the exhaust throttle valve 18 is closed, the electronic control device 40 thus detects a change in the differential pressure ΔP made through the operation of the exhaust throttle valve 18 using the differential pressure sensor 34 (step S120). Next, the electronic control device 40 calculates the increase in the exhaust backpressure in the upstream portion relative to the exhaust throttle valve 18 based upon the detected change in the differential pressure ΔP, an air volume obtained from a detection value of the airflow meter 31 and exhaust temperatures detected by the temperature sensors 32, 33 (step S130).

Then, the electronic control device 40 determines whether the increase in the exhaust backpressure is less than a predetermined value or not (step S140). If the increase in the exhaust backpressure is less than the predetermined value, it is determined that the opening amount of the exhaust throttle valve 18 has not been reduced so that the cross sectional area of the exhaust passage 14 is smaller than a predetermined cross sectional area. Because of such determination, if the increase in the exhaust backpressure is less than the predetermined value, the electronic control device 40, which functions as determining means, determines that the exhaust throttle valve 18 is malfunctioning (step S150). In the meantime, if the increase in the exhaust backpressure is equal to or greater than the predetermined value, the electronic control device 40 determines that the exhaust throttle valve 18 is operating normally (step S160) because it is determined that the exhaust throttle valve 18 is fully closed.

Figure 5A:
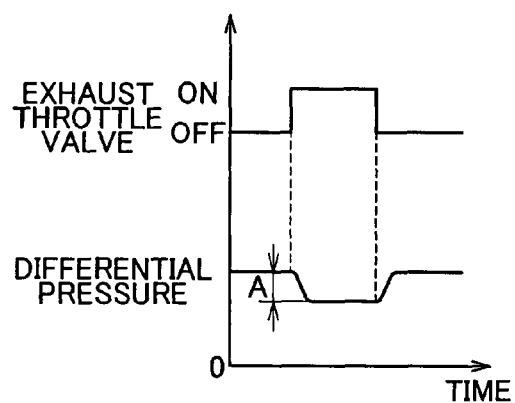
FIGS. 5A and 5B are time charts showing a change in the differential pressure when the exhaust throttle valve operates normally.
Figure 5B:
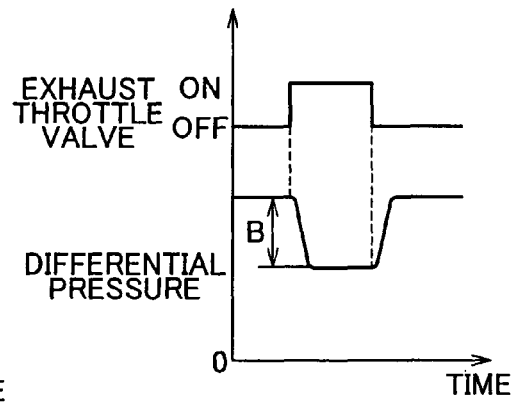
Figure 6A:
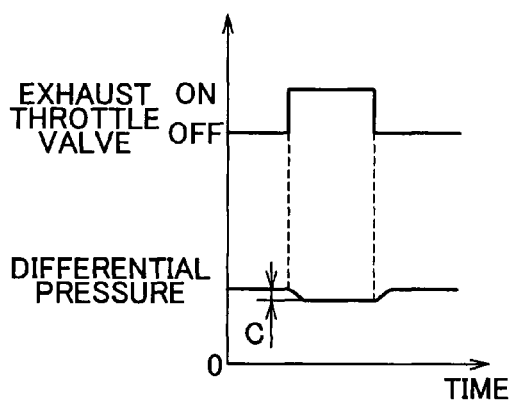
FIGS. 6A and 6B are time charts showing the change in the differential pressure when the exhaust throttle valve malfunctions.
Figure 6B:
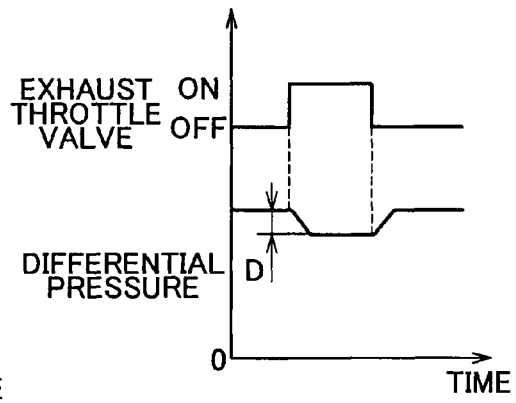

FIG. 5 shows a change in the differential pressure ΔP made when the exhaust throttle valve 18 operates normally, while FIG. 6 shows another change in the differential pressure ΔP made when the exhaust throttle valve 18 is malfunctioning. FIGS. 5A and 6A show changes in the differential pressure ΔP when the exhaust throttle valve 18 is driven in the ON/OFF mode when the amount of accumulated PM is small. FIGS. 5B and 6B show changes of the differential pressure ΔP when the exhaust throttle valve 18 is driven in the ON/OFF mode when the amount of accumulated PM is large.

As shown in FIGS. 5 and 6, if the exhaust throttle valve 18 is operating normally, the changes A, B in the differential pressure ΔP in the ON/OFF mode drive are large. If the exhaust throttle valve 18 is malfunctioning, the changes C, D in the differential pressure ΔP in the ON/OFF mode drive are small. Also, if the amount of accumulated PM is large, the differential pressure ΔP is greater than the differential pressure ΔP when the amount of accumulated PM is small. In addition, the changes B, D in the differential pressure ΔP when the accumulated amount is large are larger than the changes A, C in the differential pressure ΔP when the accumulated amount is small. The electric control device 40 calculates the increase in the exhaust backpressure based upon the change in the differential pressure ΔP to determine whether the exhaust throttle valve 18 is malfunctioning.

If it is determined in step S150 that the exhaust throttle valve 18 is malfunctioning, the electronic control device 40 turns a warning lamp on (step S170) to inform the driver that the exhaust throttle valve 18 is malfunctioning and ends the exhaust throttle valve malfunction determining routine.

Meanwhile, if it is determined in step S160 that the exhaust throttle valve 18 is normal, the electronic control device 40, which functions as estimating means, calculates the regeneration speed of the PM filter corresponding to the increase in the exhaust backpressure calculated based upon the differential pressure ΔP and estimates a regeneration degree of the PM filter 17 (step S180). The regeneration speed of the PM filter 17 is calculated based on the estimated burning speed of the PM and the closing degree of the exhaust throttle valve 18. The burning speed of the PM is estimated from the increase in the exhaust backpressure using the fact that the amount of the oxygen increases following the increase in the exhaust backpressure and the burning speed becomes faster. The electronic control device 40 then estimates the regeneration degree of the PM filter 17 based upon the regeneration speed thereof.

Next, the electronic control device 40 determines whether the exhaust throttle valve 18 is moved to the OFF state from the ON state (step S190). If the exhaust throttle valve 18 is not moved to the OFF state from the ON state, the exhaust throttle valve 18 is still fully closed. Thus, the electronic control device 40 returns to step S180 and repeats the estimation of the regeneration degree of the particulate filter 17. If the exhaust throttle valve 18 is moved to the OFF state from the ON state, the exhaust throttle valve 18 is fully open. Therefore, the exhaust throttle valve malfunction determining routine is repeated from step S110.

As thus described, the electronic control device 40 determines whether there is a malfunction with the exhaust throttle valve 18 based upon the change in the differential pressure ΔP and estimates the regeneration degree of the PM filter 17 based upon the differential pressure ΔP when the exhaust throttle valve 18 operates normally. Then, the electronic control device 40 ends the filter regeneration control when it is determined that the PM accumulated in the PM filter 17 is completely removed.

According to the exhaust gas purification system for an internal combustion engine in the above embodiment, the following effects are obtained.

(a) In the above embodiment, the electronic control device 40 determines whether there is a malfunction with the exhaust throttle valve 18 based upon the change in the differential pressure ΔP between the upstream and downstream portions relative to the PM filter 17 detected by the differential pressure sensor when the exhaust throttle valve 18 is operated. The change in the differential pressure ΔP when the exhaust throttle valve 18 is operated are different between the condition that the exhaust throttle valve 18 operates normally and the condition that the exhaust throttle valve 18 malfunctions as shown in FIGS. 5A, 5B, 6A and 6B. The electronic control device 40 thus properly determines that the exhaust throttle valve 18 is malfunctioning by detecting the operational states of the exhaust throttle valve 18 based upon the change in the differential pressure ΔP. Therefore, such a situation can be favorably avoided that the filter regeneration does not sufficiently proceed due to the malfunction with the exhaust throttle valve and the deterioration of the fuel economy and the melting loss of the filter are invited.

(b) In the above embodiment, the electronic control device 40 calculates the increase in the exhaust backpressure in the upstream portion of the exhaust throttle valve 18 based upon the change amount in the differential pressure ΔP detected by the differential pressure sensor, and so forth, when the exhaust throttle valve 18 is operated, and determines whether there is a malfunction with the exhaust throttle valve 18 based upon the increase in the exhaust backpressure. By calculating the increase in the exhaust backpressure as thus discussed, the operational states of the exhaust throttle valve 18 can be determined regardless of the amount of accumulated PM. Therefore, the malfunctions of the exhaust throttle valve may be accurately determined by comparing the increase in the exhaust backpressure with the predetermined value.

(c) In the above embodiment, the electronic control device 40 estimates the regeneration degree of the PM filter 17 based upon the differential pressure ΔP detected by the differential pressure sensor 34 when the electronic control device 40 determines that the exhaust throttle valve 18 is normal. The change in the differential pressure ΔP when the exhaust throttle valve 18 is operated are different between the condition that the accumulated amount of the trapped PM is large and the accumulated amount thereof is small as shown in FIGS. 5A and 5B. The electronic control device 40 thus can estimate the amount of accumulated PM based upon the change in the differential pressure ΔP and can further estimate the regeneration degree of the PM filter 17. Therefore, the electronic control device 40 may properly determine the termination time of the regeneration of the PM filter 17. The unnecessary or insufficient regeneration of the PM filter 17 may be prevented.

(d) In the above embodiment, the electronic control device 40 calculates the regeneration speed of the PM filter 17 corresponding to the increase in the exhaust backpressure by using the increase in the exhaust backpressure calculated based upon the differential pressure ΔP to estimate the regeneration degree of the PM filter 17. By using the increase in the exhaust backpressure as thus discussed, the electronic control device 40 can accurately calculate the regeneration speed of the PM filter 17 based upon the oxidizing speed of the PM and the closing degree of the exhaust throttle valve 18. Therefore, the electronic control device 40 can favorably estimate the regeneration degree of the PM filter 17.

The above embodiment can be modified as follows:

(a) In the above embodiment, whether the exhaust throttle valve 18 is malfunctioning is determined every time when the open exhaust throttle valve 18 is closed. Such malfunction determination, however, does not need to be executed every time and can be executed at predetermined intervals.

(b) In the above embodiment, the malfunction determination of the exhaust throttle valve 18 and the estimation of the regeneration degree of the PM filter 17 are executed based upon the increase in the exhaust backpressure calculated based upon the change in the differential pressure ΔP. Alternatively, the malfunction determination of the exhaust throttle valve 18 and the estimation of the regeneration degree of the PM filter 17 can be executed based upon other parameters which are obtained based upon the differential pressure ΔP such as a change rate of the differential pressure ΔP.

(c) In the above embodiment, the open exhaust throttle valve 18 is closed to vary the cross sectional area of the exhaust passage 14. Alternatively, the exhaust throttle valve 18 can be arbitrarily opened and, thereby, the passage cross sectional area may be varied. Even though the exhaust throttle valve 18 can be arbitrarily opened, the present invention is practicable using the same principle. In this alternative, the waste gate 20 can be omitted.

(d) In the above embodiment, the unburned fuel components are supplied by the post injections of the fuel injectors 16 or the like. Alternatively, a supplemental fuel valve may be provided upstream of the PM filter 17 in the exhaust passage 14 to supply the unburned fuel components.

While the invention has been described with reference to example embodiments thereof, it is to be understood that the invention is not limited to the described embodiments or constructions. To the contrary, the invention is intended to cover various modifications and equivalent arrangements. In addition, while the various elements of the embodiments are shown in various example combinations and configurations, other combinations and configurations, including more, less or only a single element, are also within the scope of the invention.

What is claimed is:

1. An exhaust gas purification system for an internal combustion engine, comprising:

a filter that is disposed in an exhaust passage and that traps particulate matter discharged from the internal combustion engine;

a differential pressure sensor that detects a differential pressure between a portion of the exhaust passage upstream of the filter and a portion of the exhaust passage downstream of the filter;

an exhaust throttle valve that is disposed downstream of the filter in the exhaust passage and that adjusts a cross sectional area of the exhaust passage and is operated based upon the differential pressure detected by the differential pressure sensor thereby the particulate matter trapped by the filter is burned so that the filter is regenerated; and a determining section that determines whether the exhaust throttle valve is malfunctioning based upon a change in the differential pressure that is detected by the differential pressure sensor when the exhaust throttle valve is operated, and determines whether the exhaust throttle valve is malfunctioning based on the change in the differential pressure and an amount of accumulated particulate matter.

2. The exhaust gas purification system for an internal combustion engine according to claim 1, wherein a termination time of a regeneration cycle of the filter is determined based upon the differential pressure detected by the differential pressure sensor.

3. The exhaust gas purification system for an internal combustion engine according to claim 1, further comprising:

an estimating section that estimates a regeneration degree of the filter based upon the change in the differential pressure before and after the exhaust throttle valve is operated if the determining section determines that the exhaust throttle valve is not malfunctioning.

4. The exhaust gas purification system for an internal combustion engine according to claim 3, wherein the estimating section calculates the increase in the exhaust backpressure in the portion of the exhaust passage upstream of the exhaust throttle valve based upon the change in the differential pressure before and after the exhaust throttle valve is operated, and calculates a regeneration speed of the filter corresponding to the increase in the exhaust backpressure to estimate the regeneration degree.

5. An exhaust gas purification system for an internal combustion engine, comprising:

a filter that is disposed in an exhaust passage and that traps particulate matter discharged from the internal combustion engine;

a differential pressure sensor that detects a differential pressure between a portion of the exhaust passage upstream of the filter and a portion of the exhaust passage downstream of the filter;

an exhaust throttle valve that is disposed downstream of the filter in the exhaust passage and that adjusts a cross sectional area of the exhaust passage, and is operated based upon the differential pressure detected by the differential pressure sensor thereby the particulate matter trapped by the filter is burned so that the filter is regenerated; and a determining section that determines whether the exhaust throttle valve is malfunctioning based upon a change in the differential pressure that is detected by the differential pressure sensor when the exhaust throttle valve is operated, and calculates an increase in an exhaust backpressure in a portion of the exhaust passage upstream of the exhaust throttle valve based upon the change in the differential pressure detected by the differential pressure sensor before and after the exhaust throttle valve is operated, and determines whether the exhaust throttle valve is malfunctioning based upon the increase in the exhaust backpressure.

6. The exhaust gas purification system for an internal combustion engine according to claim 5, wherein:

the exhaust throttle valve is opened and closed; and the determining section determines that the exhaust throttle valve is malfunctioning if the increase in the exhaust backpressure is below a predetermined value when the open exhaust throttle valve is closed.

7. The exhaust gas purification system for an internal combustion engine according to claim 5, wherein a termination time of a regeneration cycle of the filter is determined based upon the differential pressure detected by the differential pressure sensor.

8. The exhaust gas purification system for an internal combustion engine according to claim 5, further comprising:

an estimating section that estimates a regeneration degree of the filter based upon the change in the differential pressure before and after the exhaust throttle valve is operated if the determining means determines that the exhaust throttle valve is not malfunctioning.

9. The exhaust gas purification system for an internal combustion engine according to claim 8, wherein the estimating section calculates the increase in the exhaust backpressure in the portion of the exhaust passage upstream of the exhaust throttle valve based upon the change in the differential pressure before and after the exhaust throttle valve is operated, and calculates a regeneration speed of the filter corresponding to the increase in the exhaust backpressure to estimate the regeneration degree.

* * * * *